United States Patent
Kato (10) Patent No.: US 9,313,422 B2
(45) Date of Patent: Apr. 12, 2016

(54) VIDEO PROCESSING DEVICE

(75) Inventor: Akihiro Kato, Kodaira (JP)

(73) Assignee: Hitachi Kokusai Electric Inc., Chiyoda-ku, Tokyo (JP)

( * ) Notice: Subject to any disclaimer, the term of this patent is extended or adjusted under 35 U.S.C. 154(b) by 237 days.

(21) Appl. No.: 14/123,949

(22) PCT Filed: May 11, 2012

(86) PCT No.: PCT/JP2012/062183
§ 371 (c)(1),
(2), (4) Date: Dec. 4, 2013

(87) PCT Pub. No.: WO2012/169313
PCT Pub. Date: Dec. 13, 2012

(65) Prior Publication Data
US 2014/0104457 A1  Apr. 17, 2014

(30) Foreign Application Priority Data
Jun. 8, 2011 (JP) ................. 2011-127819

(51) Int. Cl.
*G09G 5/02* (2006.01)
*H04N 5/278* (2006.01)
*H04N 9/74* (2006.01)
*H04N 5/232* (2006.01)
(Continued)

(52) U.S. Cl.
CPC .......... *H04N 5/278* (2013.01); *H04N 5/23293* (2013.01); *H04N 9/74* (2013.01); *H04N 7/025* (2013.01); *H04N 7/08* (2013.01)

(58) Field of Classification Search
CPC ............. G09G 5/14; G09G 2340/10; G09G 2340/125; G06T 11/60; G06T 15/503
USPC .......................................... 345/629
See application file for complete search history.

(56) References Cited

U.S. PATENT DOCUMENTS 6,201,570 B1   3/2001  Murata et al.
6,785,814 B1 *  8/2004  Usami ............... H04N 1/32101
                                            380/200

(Continued)

FOREIGN PATENT DOCUMENTS

JP    6-22216 A    1/1994
JP    10-26963 A   1/1998
JP    10-93983 A   4/1998

(Continued)

*Primary Examiner* — Ke Xiao
*Assistant Examiner* — Gordon Liu
(74) *Attorney, Agent, or Firm* — Taft Stettinius & Hollister LLP (57) ABSTRACT

Provided is a video processing device with which it is possible to efficaciously carry out a process of superpositioning a monitor character signal in a video signal which is inputted from a camera and outputting same separately from the video signal. The video processing device comprises: a character signal emitter which generates a character signal on the basis of the monitor data; and a character superposition unit which superpositions the character signal which is generated by the character signal emitter upon the least significant bits of the color difference signal of the video signal which is inputted from the camera. With respect to downconverting the video signal whereupon the character signal has been superpositioned, only a downsampling process on the least significant bits of the color difference signal is carried out, and an interpolation filter process is not carried out.

8 Claims, 5 Drawing Sheets

(51) Int. Cl.
*H04N 7/025* (2006.01)
*H04N 7/08* (2006.01)

(56) References Cited

U.S. PATENT DOCUMENTS

2007/0018995 A1   1/2007  Koyanagi et al.
2007/0140569 A1*  6/2007  Tabuchi ............... H04N 19/117
                                                     382/232

FOREIGN PATENT DOCUMENTS

| JP | 10-98634 A    | 4/1998 |
| JP | 11-85139 A    | 3/1999 |
| JP | 2003-60974 A  | 2/2003 |
| JP | 2007-28408 A  | 2/2007 |
| JP | 4170070 B2    | 8/2008 |
| JP | 2011-29744 A  | 2/2011 |

* cited by examiner

VIDEO PROCESSING DEVICE

TECHNICAL FIELD

The present invention relates to a video processing device for superposing a character signal for a monitor on a video signal inputted from a camera device and for outputting the resulting signal separately from the above-described video signal.

BACKGROUND ART

A conventional camera control device for controlling the operation of a television camera is provided so that the video of the television camera is controlled from a remote location. As image sensors for television cameras and the high-speed signal processing technology progress, high quality standards such as for 1080p that handles a frame video of 1920 samples by 1080 lines in progressive scanning have arisen. Meanwhile, it is also required to output the 1080i signal, the SDTV (standard definition television) signal and the like at the same time according to the conventional standard. Therefore, video processing devices for converting the inputted video signal into a number of video formats through a format converting circuit for output have been provided in camera control devices.

It is common to provide an output (output of a PIX signal) where character information such as for a menu screen (data for a monitor) has been superposed on the video signal for a picture monitor separately from a main line video signal to be provided for broadcasting in order for an operator or engineer within the broadcasting station to set the camera's video quality while viewing the video. As described above, however, a character signal generator for generating a character signal that fits each video format becomes necessary when the number of types of videos to be handled is great, which leads to an increase in the cost and scale of the circuit.

Figure 5:
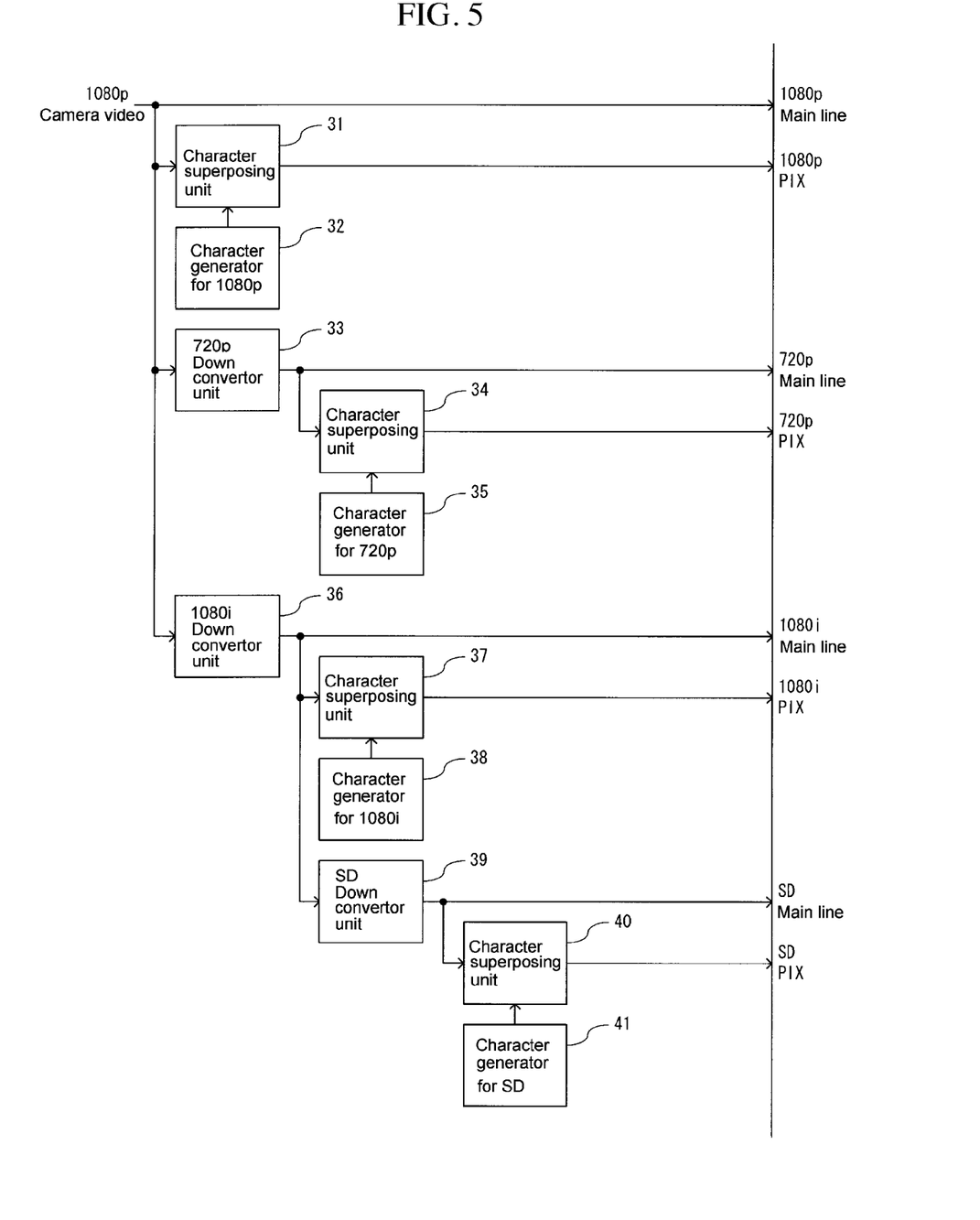
FIG. 5 is a diagram showing an example of the structure of a video processing device according to the conventional system.

FIG. 5 shows an example of the structure of a video processing device according to a conventional system. Here, video signals inputted from the television camera to the camera control device are 1080p (1920×1080, progressive) while output video signals are 720p (1280×720, progressive), 1080i (1920×1080, interlace), and SD (720×480, interlace) in addition to 1080p.

In the video processing device, a character signal for 1080p that has been generated in the character generator 32 for 1080p is superposed on the video signal of 1080p that has been inputted from the television camera in the character superposing unit 31 so that a PIX signal of the 1080p format is generated for output. In addition, a character signal for 720p that has been generated in the character generator 35 for 720p is superposed on the video signal that has been format converted from 1080p to 720p in the 720p down convertor unit 33 in the character superposing unit 34 so that a PIX signal of the 720p format is generated for output. Moreover, a character signal for 1080i that has been generated in the character generator 38 for 1080i is superposed on the video signal that has been format converted from 1080p to 1080i in the 1080i down convertor unit 36 in the character superposing unit 37 so that a PIX signal of the 1080i format is generated for output. Furthermore, a character signal for SD that has been generated in the character generator 41 for SD is superposed on the video signal that has been format converted from 1080i to an SDTV signal in the SD down convertor unit 39 in the character superposing unit 40 so that a PIX signal of the SD format is generated for output. As described above, the video processing device according to the conventional system requires the same number of character generators as the number of video formats for the PIX signal outputs.

PRIOR ART DOCUMENT

Patent Document

Patent Document 1: Japanese Unexamined Patent Publication 2011-029744

SUMMARY OF THE INVENTION

Problem to be Solved by the Invention

An object of the present invention is to provide a video processing device for effectively carrying out a process for superposing a character signal for a monitor on a video signal inputted from a camera and for outputting the resulting signal separately from the above-described video signal.

Means for Solving Problem

According to the present invention, a video processing device for interposing a character signal that indicates a state of a camera or a state of a camera control device for controlling the operation of the camera on a video signal inputted from the camera and for outputting a resulting signal separately from the video signal is provided with: a character signal generator that generates a character signal on the basis of the state of the above-described camera or the state of the above-described camera control device; and a character signal superposing unit that superposes the character signal generated by the above-described character signal generator on the least significant bit of a color difference signal of the video signal inputted from the above-described camera.

That is to say, a character signal for a monitor is superposed on the initial input video signal (video signal inputted from the camera), and thus, the video signal on which the character signal has been superposed can be down-converted so that a number of video signals having different video formats be gained in a state where the character signal has been superposed, and therefore, character generators for the respective video formats become unnecessary. In addition, the character signal is superposed on the least significant bit of the color difference signal which least visually affects the main line video signal, and therefore, the video signal on which the character signal has been superposed can be provided for broadcasting as the main line video signal without change.

In addition, according to the present invention, the video processing device is further provided with a character signal visualizing unit for visualizing the character signal superposed on the video signal by converting a color difference signal in the video signal on which the character signal is superposed and a brightness signal of the video portion where a value for indicating a character unit is stored in the least significant bit of the color difference signal to predetermined values. Accordingly, the video signal where the character signal has been visualized can be outputted for a monitor separately from the main line video signal.

Furthermore, according to the present invention, the video processing device is additionally provided with a down convertor unit that reduces the number of pixels of the video signal on which the character signal has been superposed by carrying out a thinning process and an interpolation filtering process on the brightness signal and the color difference signal excluding the least significant bit, where the thinning process is carried out while the interpolation filtering process is not carried out on the least significant bit of the color difference signal in the video signal. Accordingly, the character signal can be prevented from being lost during the interpolation filter process.

Moreover, according to the present invention, the video processing device is further provided with a number of down convertor units that reduce the number of pixels of the video signal to different numbers of pixels downstream from the above-described character signal superposing unit. Accordingly, a number of video signals having different video formats can be gained in a state where the character signal has been superposed, and therefore, character generators for the respective video formats become unnecessary.

Effects of the Invention

As described above, the video processing device according to the present invention makes it possible to effectively carry out a process for superposing a character signal for a monitor on a video signal inputted from the camera and for outputting the resulting signal separately from the above-described video signal, and thus, a reduction in the cost of the device and the scale of the circuit can be achieved.

PREFERRED EMBODIMENTS OF THE INVENTION

Figure 1:
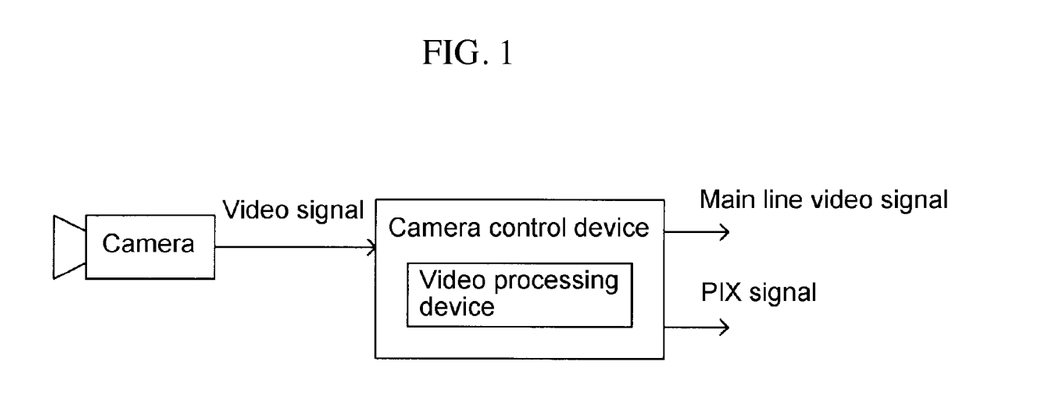
FIG. 1 is a diagram showing an example of the structure of a camera control system to which the present invention is applied.

An embodiment of the present invention is described in reference to the drawings. FIG. 1 shows an example of the structure of the camera control system to which the present invention is applied. The camera control system of this example is provided with a camera control device for controlling the operation of a television camera (hereinafter abbreviated as camera), and thus has a structure where a video processing device is provided within the camera control device. Here, the video processing device may be provided outside the camera control device as a separate device from the camera control device.

In the camera control device of this example, a video signal inputted from the camera is processed by the video processing device so as to output a main line video signal and a PIX signal. The main line video signal is a video signal to be provided for broadcasting, which is viewed and listened to by a general audience. Meanwhile, the PIX signal is a video signal to be provided for the adjustment of the video quality of the camera where character information for indicating the state of the camera is superposed so as to be visible, and thus is viewed and listened to by an operator or an engineer within the broadcasting station (the person who is in charge of the adjustment of the camera). The operator checks the state of the camera in reference to the character information displayed on the video by the PIX signal and gives instructions for controlling the operation of the camera to the camera control device if necessary.

Figure 2:
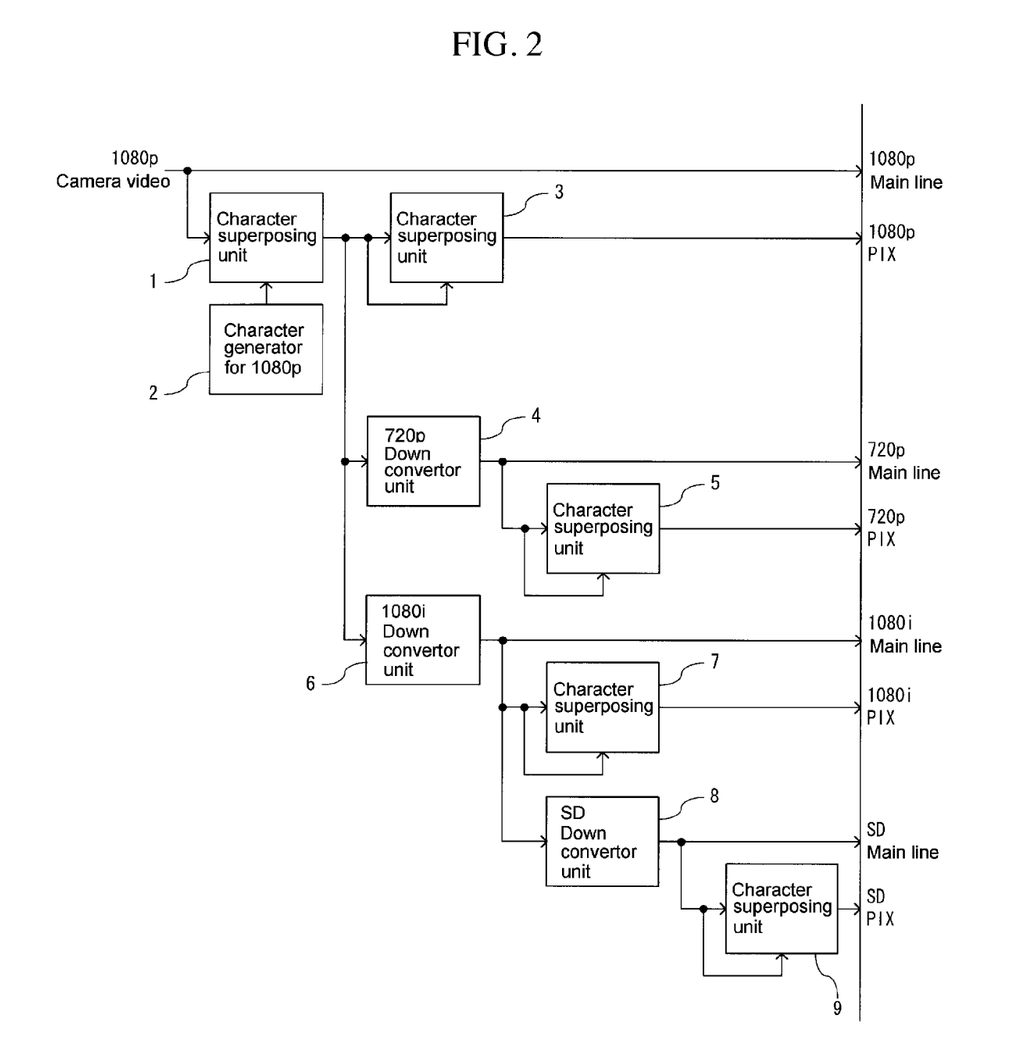
FIG. 2 is a diagram showing an example of the structure of the video processing device according to an embodiment of the present invention.
Figure 3:
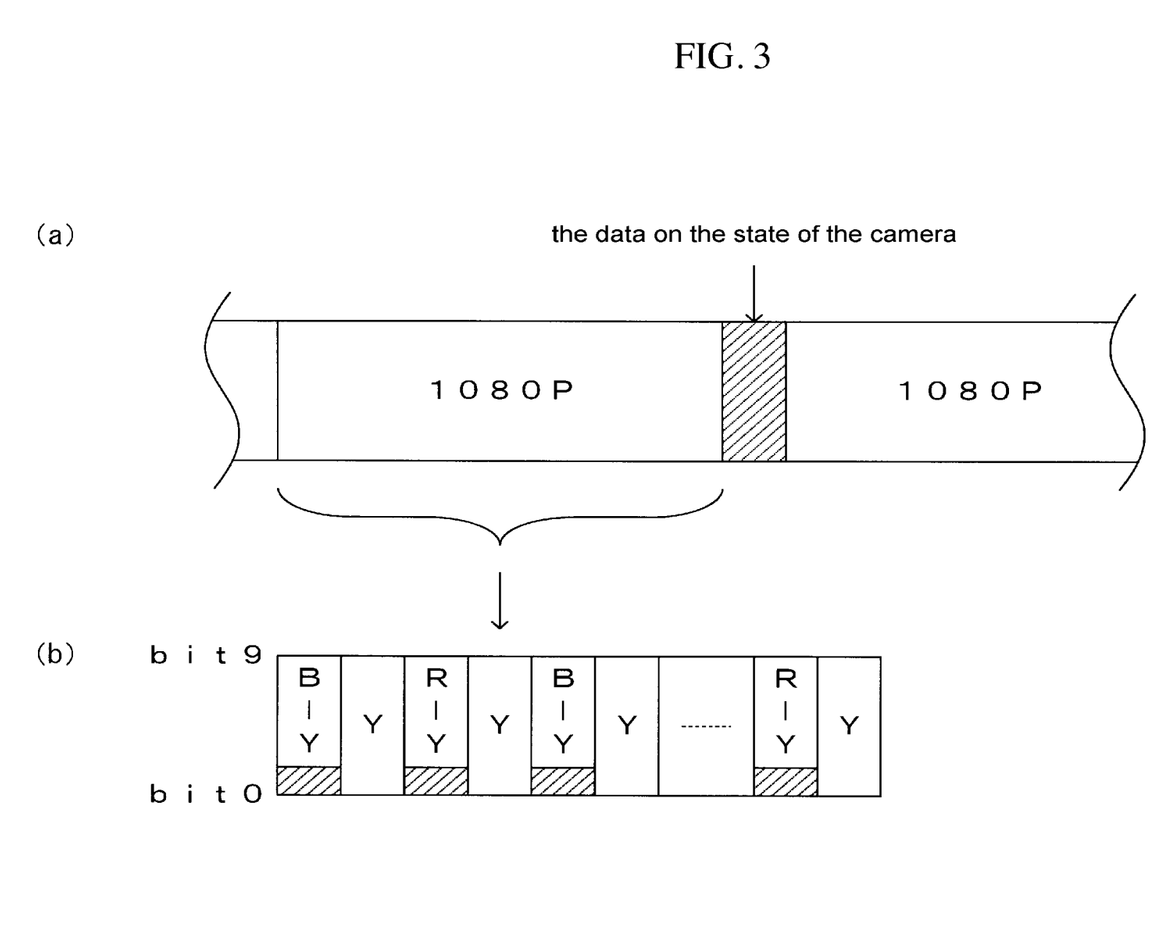
FIG. 3 is a diagram schematically showing the superposing of a character signal by the video processing device according to one embodiment of the present invention.

FIG. 2 shows an example of the structure of the video processing device according to one embodiment of the present invention. The video processing device of this example is provided with one character generator 2, three down convertor units 4, 6, and 8, and five character superposing units 1, 3, 5, 7, and 9. The video processing device of this example outputs a main line video signal and a PIX signal of 1080p, a main line video signal and a PIX signal of 720p, a main line video signal and a PIX signal of 1080i, as well as a main line video signal and a PIX signal of SD on the basis of the video signal of 1080p inputted from the camera. Each PIX signal is generated on the basis of the data on the state of the camera inputted from the camera. In this example, as shown in FIG. 3(a), the data on the state of the camera is provided as data for a monitor along with the video signal of 1080p in the structure.

The operation of the video processing device of this example is described below. The video processing device of the present example outputs the video signal of 1080p inputted from the camera to the outside as a main line video signal of 1080p, and at the same time inputs the same signal into the character superposing unit 1. In addition, the video processing device of this example generates character information for the adjustment of the video quality of the camera by an operator or an engineer in the broadcasting station (character information for indicating the state of the camera) on the basis of the data on the state of the camera inputted from the camera and inputs the same information into the character generator 2 for 1080p. The character generator 2 for 1080p generates a character signal for 1080p where the inputted character information is converted to images on the basis of the character information and inputs the same signal into the character superposing unit 1.

The character superposing unit 1 superposes the character signal for 1080p that has been inputted from the character generator 2 for 1080p on the video signal of 1080p that has been inputted from the camera. Here, the character signal is not superposed at the signal levels that can be seen by the eye. As shown in FIG. 3(b), the least significant bit (LSB) in the color difference signal (B-Y, R-Y) instead of the brightness signal (Y) is replaced '1' for a character portion or '0' for a non-character portion. Thus, the superposing is carried out in such a manner that the characters cannot be distinguished in the video by the eye. Therefore, the video signal on which the character signal has been superposed in the LSB of the color difference signal is provided for the subsequent format convertor unit.

When the visibility is compared between the brightness signal (Y) and the color difference signal (B-Y, R-Y), the color difference signal (B-Y, R-Y) is lower than the brightness signal (Y). Therefore, in this example, the character signal is superposed on the color difference signal (B-Y, R-Y) having lower visibility so that the character information superposed on the camera video is not conspicuous. Here, the character signal may be superposed only on the color difference signal of the blue component (B-Y) or the color difference signal of the red component (R-Y). In this case, it is preferable for the character signal to be superposed on the color difference signal of the blue component (B-Y) having lower visibility.

The video signal of 1080p on which the character signal has been superposed by the character superposing unit 1 is inputted into the character superposing unit 3, the 720p down convertor unit 4, and the 1080i down convertor unit 6. The character superposing unit 3 takes out the character signal from the LSB in the color difference signal in the video signal of 1080p that has been inputted from the character superposing unit 1 and converts the character signal level to a signal level that can be seen by the eye, and then superposes the resulting signal again on the video signal so that the character signal can be visualized. Concretely, the brightness signal and the color difference signal in the video portions where the value stored in the LSB in the color difference signal is '1' (the value indicating a letter portion) are converted to predetermined values. In this example, the values are changed to 70% for the brightness and 0% for the color difference, but the values are not limited to these as long as the operator can distinguish the characters comfortably. In addition, a number of character colors may be expressed in accordance with the combinations of bit values of the character signals superposed on the color difference signal for the blue component (B-Y) and the color difference signal for the red component (R-Y). The video signal of 1080p gained by visualizing a character signal by the character superposing unit 3 is outputted to the outside as a PIX signal of 1080p.

The 720p down convertor unit 4 format converts (down converts) the video signal of 1080p inputted from the character superposing unit 1 to a video format of 720p including the character signal. The video signal of 720p that has been down converted by the 720p down convertor unit 4 is outputted to the outside as a 720p main line video signal without change, and at the same time is inputted into the character superposing unit 5. The main line video signal of 720p is in a state where the character signal has been superposed, which is a mode that is difficult to distinguish, and therefore, there is no inconvenience when the main line video signal is broadcasted.

The character superposing unit 5 takes out a character signal from the LSB of the color difference signal in the video signal of 720p that has been inputted from the 720p down convertor unit 4 and converts the character signal to the signal level that can be seen by the eye so that the character signal is again superposed on the video signal so as to be visualized. The video signal of 720p of which the character signal has been visualized by the character superposing unit 5 is outputted to the outside as a PIX signal of 720p.

The 1080i down convertor unit 6 format converts (down converts) the video signal of 1080p that has been inputted from the character superposing unit 1 to the video format of 1080i including a character signal. The video signal of 1080i that has been down converted by the 1080i down convertor unit 6 is outputted to the outside as the main line video signal of 1080i without change, and at the same time is inputted into the character superposing unit 7 and the SD down convertor unit 8. The main line video signal of 1080i is in a state where the character signal has been superposed, which is a mode that is difficult to distinguish, and therefore, there is no inconvenience when the main line video signal is broadcasted.

The character superposing unit 7 takes out a character signal from the LSB of the color difference signal in the video signal of 1080i that has been inputted from the 1080i down convertor unit 6 and converts the character signal to the signal level that can be seen by the eye so that the character signal is again superposed on the video signal so as to be visualized. The video signal of 1080i of which the character signal has been visualized by the character superposing unit 7 is outputted to the outside as a PIX signal of 1080i.

The SD down convertor unit 8 format converts (down converts) the video signal of 1080i that has been inputted from the 1080i down convertor unit 6 to the video format for SD including the character signal. The video signal of SD that has been down converted by the SD down convertor unit 8 is outputted to the outside as the main line video signal of SD without change, and at the same time is inputted into the character superposing unit 9. The main line video signal of SD is in a state where the character signal has been superposed, which is a mode that is difficult to distinguish, and therefore, there is no inconvenience when the main line video signal is broadcasted.

The character superposing unit 9 takes out a character signal from the LSB of the color difference signal in the video signal of SD that has been inputted from the SD down convertor unit 8 and converts the character signal to the signal level that can be seen by the eye so that the character signal is again superposed on the video signal so as to be visualized. The video signal of SD of which the character signal has been visualized by the character superposing unit is outputted to the outside as a PIX signal of SD.

Figure 4:
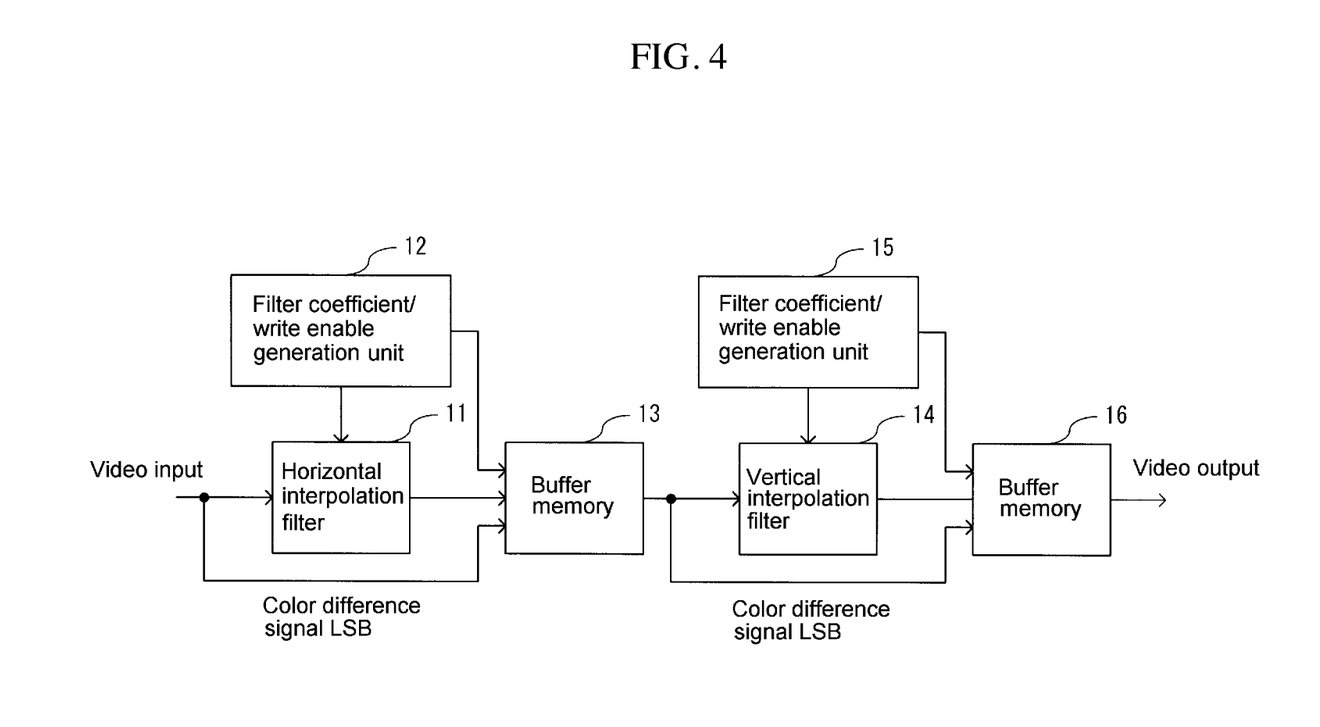
FIG. 4 is a diagram showing an example of the structure of the down convertor in the video processing device according to one embodiment of the present invention.

Next, the operation of each down convertor unit 4, 6, and 8 is described. FIG. 4 shows an example of the structure of the format converting circuit for the down convertor units 4, 6, and 8. The format converting circuit in this example has a horizontal interpolation filter 11, a filter coefficient/write enable generation unit 12, a buffer memory 13, a vertical interpolation filter 14, a filter coefficient/write enable generation unit 15, and a buffer memory 16.

The filter coefficient/write enable generation unit 12 controls the down conversion of the video signal in the horizontal direction. The write enable signal outputted from the filter coefficient/write enable generation unit 12 is a pulse signal to be written into the buffer memory 13 in the rear stage after thinning the video signal and is used for the data write-in control in the horizontal direction in the buffer memory 13. The conversion ratio in the horizontal direction is 1920:1280 in the case where the format is converted from 1080p to 720p, and therefore, the video with three pixels is thinned by taking out the data of two pixels. In addition, the filter coefficient to be outputted from the filter coefficient/write enable generation unit 12 is a coefficient for carrying out an interpolation filter process such as band restriction and a smoothing process before the video signal is thinned and is used for the interpolation filter process in the horizontal direction in the horizontal interpolation filter 11.

Here, the video signal has a character signal superposed on the LSB of the color difference signal, and therefore, the character signal would be lost if the video signal passes through the horizontal interpolation filter 11 without change. Therefore, only LSB of the color difference signal in the video signal is written into the buffer memory 13 by only carrying out thinning process, without passing through the interpolation filter.

Next, the filter coefficient/write enable generation unit 15 controls the down conversion of the video signal in the vertical direction. The write enable signal outputted from the filter coefficient/write enable generation unit 15 is a pulse signal to be written into the buffer memory 16 in the rear stage after the video signal has been thinned and is used for the data write-in control in the vertical direction in the buffer memory 16. In addition, the filter coefficient outputted from the filter coefficient/write enable generation unit 15 is a coefficient for carrying out an interpolation filter process such as band restriction and a smoothing process before the video signal has been thinned and is used for the interpolation filter process in the vertical direction in the vertical interpolation filter 14.

Here, a character signal has been superposed on the LSB of the color difference signal in the video signal in the same manner as in the horizontal direction, and therefore, the character signal would be lost if the video signal passes through the vertical interpolation filter 14 without change. Therefore, only LSB of the color difference signal in the video signal is written into the buffer memory 16 by only carrying out thinning process, without passing through the interpolation filter. As a result of undergoing the above-described processes, down conversion is possible while holding the character signal.

As described above in this example, one character generator for the maximum resolution signal (character generator 2 for 1080p) superposes a character signal on a number of video formats, and therefore, a character generator is unnecessary for each video format. In addition, a format converting circuit (down convertor unit 4, 6, 8) for only thinning the least significant bit of the color difference signal without carrying out an interpolation filter process is used so that format conversion can be carried out while holding the character signal. Furthermore, a character signal is superposed on the least significant bit of the color difference signal that least visually affects the main video line signal, and therefore, the video signal on which a character signal has been superposed can be broadcasted as the main line video signal without change. Accordingly, reduction in the cost of the device and reduction in the scale of the circuit can be effectively realized.

Though in this example the data on the state of the camera that has been inputted from the camera is used as the data for a monitor so that character information for indicating the state of the camera is generated on the basis of the data so as to be inputted into the character generator 2 for 1080p, the character information for other contents may be generated so as to be inputted into the character generator 2 for 1080p. For example, the data on the state of the camera control device that has been inputted from the camera control device may be used as the data for a monitor, and the character information for indicating the state of the camera control device may be generated so as to be inputted into the character generator 2 for 1080p, and thus, the operator can check the state of the camera control device.

Though in this example the video signal of 1080p has been down converted to the respective video formats of 720p, 1080i, and SD, the video signal may be converted to video formats of 486i (National Television System Committee: NTSC), 576i (Phase Alternating Line: PAL), and the like. In addition, the video signal of 4320p (Super Hi Vision) may be down converted to the respective video formats of 2160p (4K for E-Cinema), 1080p, and the like.

Here, the system and the structures of the devices according to the present invention need not be limited to those shown in the above, but rather various other structures can be used. In addition, it is possible for the present invention to provide a method or a system for implementing the process according to the present invention, a program for implementing such a method or a system, or a recording medium for recording such a program. Furthermore, it is also possible for the present invention to provide various other systems and devices. Moreover, the fields to which the present invention can be applied need not be limited to those shown in the above, but rather it is possible to apply the present invention to various other fields. As for the various types of processes carried out in the system and the devices according to the present invention, a structure where the processor runs the control program stored in a ROM (read only memory) in the hardware equipped with the processor and a memory may be a used for the control, or the respective function means for carrying out these processes may be formed as independent hardware circuits. In addition, the present invention can provide a control program as described above, or a floppy disc (registered trademark) or a CD-ROM (compact disc ROM) for storing such a control program or other recording media that can be read by a computer, and thus, the process according to the present invention can be carried out by inputting such a control program into a computer from such a recording medium so that the processor can run the control program.

EXPLANATION OF SYMBOLS

1 Character superposing unit
2 Character generator for 1080p
3 Character superposing unit
4 720p Down convertor unit
5 Character superposing unit
6 1080i Down convertor unit
7 Character superposing unit
8 SD Down convertor unit
9 Character superposing unit
11 Horizontal interpolation filter
12 Filter coefficient/write enable generation unit
13 Buffer memory
14 Vertical interpolation filter
15 Filter coefficient/write enable generation unit
16 Buffer memory
31 Character superposing unit
32 Character generator for 1080p
33 720p Down convertor unit
34 Character superposing unit
35 Character generator for 720p
36 1080i Down convertor unit
37 Character superposing unit
38 1080i Character generator
39 SD Down convertor unit
40 Character superposing unit
41 SD Character generator

The invention claimed is:

1. A video processing device for interposing a character signal that indicates a state of a camera or a state of a camera control device for controlling an operation of the camera on a video signal inputted from the camera and for outputting a resulting signal separately from the video signal, comprising:
   a character signal generator that generates a character signal on the basis of the state of the camera or the state of the camera control device;
   a character signal superposing unit that superposes the character signal generated by the character signal generator on a least significant bit of a color difference signal of the video signal inputted from the camera;
   a down convertor unit that reduces the number of pixels of the video signal on which the character signal has been superposed by carrying out a thinning process and an interpolation filtering process on the brightness signal and the color difference signal excluding the least significant bit, where the thinning process is carried out while the interpolation filtering process is not carried out on the least significant bit of the color difference signal in the video signal; and
   a number of down convertor units that reduce the number of pixels of the video signal to different numbers of pixels, provided downstream from the character signal superposing unit.

2. The video processing device according to claim 1, comprising:
   a character signal visualizing unit that visualizes the character signal superposed on the video signal by converting a color difference signal in the video signal on which the character signal is superposed and a brightness signal of the video portion where a value for indicating a character unit is stored in the least significant bit of the color difference signal to predetermined values.

3. The video processing device according to claim 1, wherein:
the character signal superposing unit superposes the character signal generated by the character signal generator on the least significant bit of a color difference signal of a blue component of the video signal inputted from the camera.

4. A video processing method for interposing a character signal that indicates a state of a camera or a state of a camera control device for controlling an operation of the camera on a video signal inputted from the camera and for outputting a resulting signal separately from the video signal, the method comprising:
generating a character signal on the basis of the state of the camera or the state of the camera control device; and
superposing the generated character signal on a least significant bit of a color difference signal of the video signal inputted from the camera;
reducing the number of pixels of the video signal on which the character signal has been superposed by carrying out a thinning process and an interpolation filtering process on the brightness signal and the color difference signal excluding the least significant bit, where the thinning process is carried out while the interpolation filtering process is not carried out on the least significant bit of the color difference signal in the video signal; and
reducing the number of pixels of the video signal to different numbers of pixels downstream from the character signal superposing unit.

5. The video processing method according to claim 4, comprising the step of:
visualizing the character signal superposed on the video signal by converting a color difference signal in the video signal on which the character signal is superposed and a brightness signal of the video portion where a value for indicating a character unit is stored in the least significant bit of the color difference signal to predetermined values.

6. The video processing method according to claim 4, wherein, in the character signal superposing step, the generated character signal is superposed on the least significant bit of a color difference signal of a blue component of the video signal inputted from the camera.

7. A computer readable storage medium storing therein a video processing program which, when executed by a computer, causes the computer to perform a video processing method for interposing a character signal that indicates a state of a camera or a state of a camera control device for controlling an operation of the camera on a video signal inputted from the camera and outputting a resulting signal separately from the video signal, the method comprising:
generating a character signal on the basis of the state of the camera or the state of the camera control device; and
superposing the character signal generated by the character signal generator on the least significant bit of a color difference signal of the video signal inputted from the camera;
reducing the number of pixels of the video signal on which the character signal has been superposed by carrying out a thinning process and an interpolation filtering process on the brightness signal and the color difference signal excluding the least significant bit, where the thinning process is carried out while the interpolation filtering process is not carried out on the least significant bit of the color difference signal in the video signal; and
reducing the number of pixels of the video signal to different numbers of pixels downstream from the character signal superposing unit.

8. The computer readable storage medium according to claim 7, wherein the method comprises the step of:
visualizing the character signal superposed on the video signal by converting a color difference signal in the video signal on which the character signal is superposed and a brightness signal of the video portion where a value for indicating a character unit is stored in the least significant bit of the color difference signal to predetermined values.

* * * * *